US010914424B2

(12) United States Patent
Sieber et al.

(10) Patent No.: US 10,914,424 B2
(45) Date of Patent: Feb. 9, 2021

(54) SERVICE DEVICE AND METHOD FOR USING A MULTI-COMPONENT INSULATING GAS DURING MAINTENANCE OF ELECTRICAL SWITCHGEAR SYSTEMS

(71) Applicant: DILO Armaturen und Anlagen GmbH, Babenhausen (DE)

(72) Inventors: Peter Sieber, Altenstadt (DE); Robert Kohler, Roggenburg (DE); Mathias Gestle, Kellmünz (DE)

(73) Assignee: DILO ARMATUREN UND ANLAGEN GMBH, Babenhausen (DE)

( * ) Notice: Subject to any disclaimer, the term of this patent is extended or adjusted under 35 U.S.C. 154(b) by 387 days.

(21) Appl. No.: 15/578,782

(22) PCT Filed: May 31, 2016

(86) PCT No.: PCT/EP2016/062309
§ 371 (c)(1),
(2) Date: Dec. 1, 2017

(87) PCT Pub. No.: WO2016/193272
PCT Pub. Date: Dec. 8, 2016

(65) Prior Publication Data
US 2018/0135804 A1    May 17, 2018

(30) Foreign Application Priority Data

Jun. 2, 2015    (DE) .................. 10 2015 108 748

(51) Int. Cl.
*F17C 7/00*     (2006.01)
*F17C 5/06*     (2006.01)
(Continued)

(52) U.S. Cl.
CPC .............. *F17C 7/00* (2013.01); *F17C 5/06* (2013.01); *H01B 3/56* (2013.01); *F17C 2221/03* (2013.01);
(Continued)

(58) Field of Classification Search
CPC ..... F17C 7/00; F17C 5/06; H01B 3/56; H01B 3/16; H01H 2033/566; H01H 33/56; H02B 13/035; H02B 13/055
See application file for complete search history.

(56) References Cited

U.S. PATENT DOCUMENTS 3,793,499 A * 2/1974 Wagner ................ H01H 33/562
218/83

FOREIGN PATENT DOCUMENTS

EP    1 091 182 A2    4/2001
JP    2000-59934 A    2/2000
(Continued)

OTHER PUBLICATIONS

Japanese Office Action and English Translation dated Mar. 18, 2020.
(Continued)

*Primary Examiner* — Timothy P. Kelly
(74) *Attorney, Agent, or Firm* — Jacobson Holman PLLC

(57) ABSTRACT

A service device for a multi-component insulating gas for use during maintenance of electrical switchgear systems comprising a compressor with a downstream condenser, a storage container, the service device is connected to a system space, and the compressor compresses the insulating gas during removal from the system space, all components of the insulating gas remain in the compressor in a gaseous state, the condenser is controlled by a controller so a condensation of the insulating gas occurs first in the storage container, a storage heating device is provided for the storage container, during filling of the system space the storage heating device (Continued)

heats the insulating gas to a temperature above the critical temperature of the insulating gas, wherein, a line heating device is provided which at least partially heats the pipeline between the storage container and the system space and/or heats elements in the pipeline.

8 Claims, 1 Drawing Sheet

(51) Int. Cl.
*H01B 3/56* (2006.01)
*H02B 13/055* (2006.01)
*H02B 3/00* (2006.01)
*H01H 33/56* (2006.01)
*H02B 13/00* (2006.01)

(52) U.S. Cl.
CPC ............ *F17C 2223/0123* (2013.01); *F17C 2225/0123* (2013.01); *F17C 2227/0157* (2013.01); *F17C 2227/0302* (2013.01); *F17C 2227/0337* (2013.01); *F17C 2227/045* (2013.01); *F17C 2260/042* (2013.01); *F17C 2260/056* (2013.01); *F17C 2270/05* (2013.01); *H01H 33/56* (2013.01); *H02B 3/00* (2013.01); *H02B 13/00* (2013.01); *H02B 13/055* (2013.01)

(56) References Cited

FOREIGN PATENT DOCUMENTS

| KR | 2012-0039771 A | 4/2012 |
| WO | 2014/037396 A1 | 3/2014 |

OTHER PUBLICATIONS

EPO Office Action for parallel European Patent Application No. 16 732 238.7, dated Feb. 11, 2019, with English translation.
International Search Report, dated Aug. 31, 2016 (2 pages).

* cited by examiner

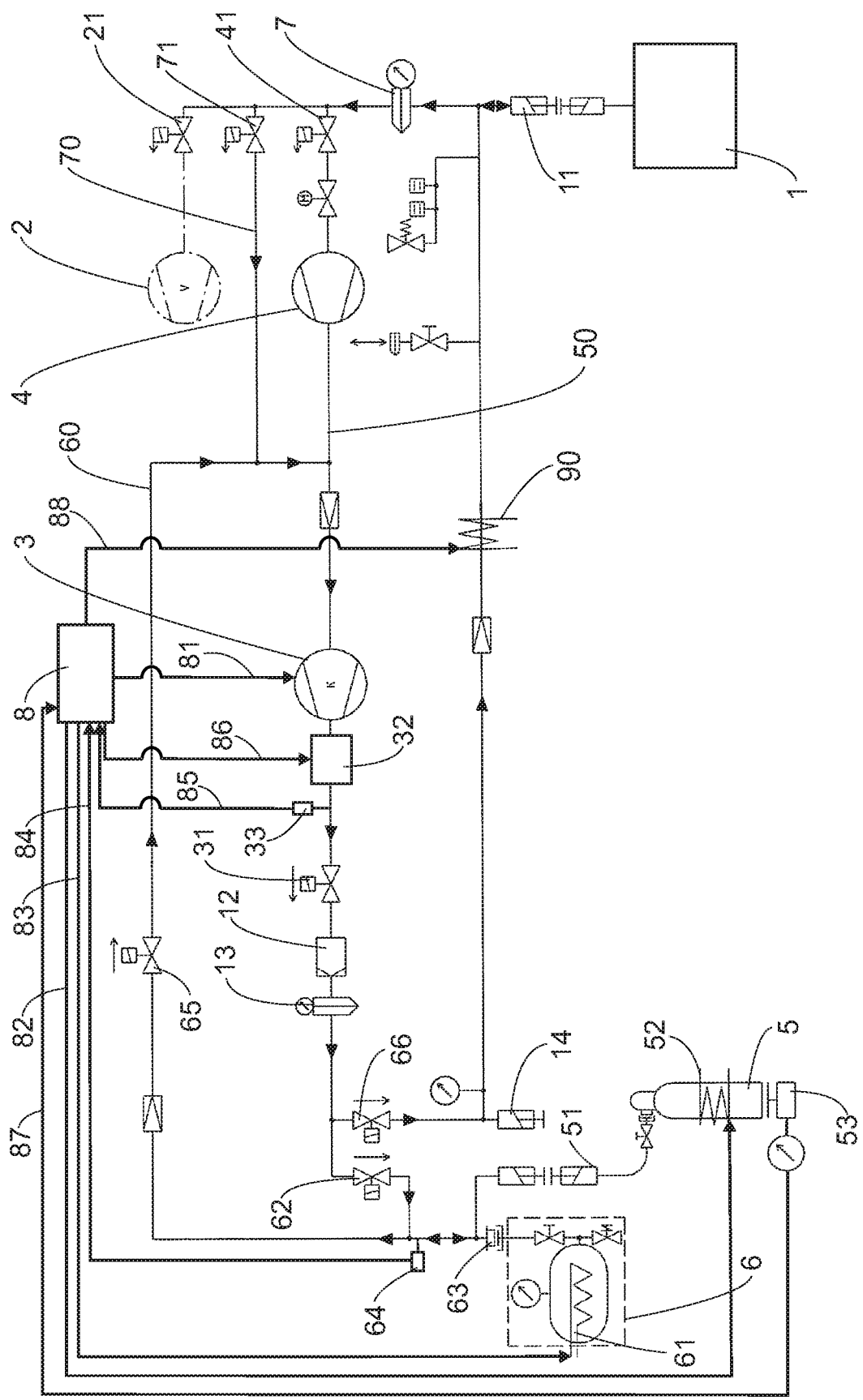

SERVICE DEVICE AND METHOD FOR USING A MULTI-COMPONENT INSULATING GAS DURING MAINTENANCE OF ELECTRICAL SWITCHGEAR SYSTEMS

BACKGROUND OF THE INVENTION

The invention relates to a service device for a multi-component insulating gas, in particular for use during maintenance of electrical switchgear systems. The invention further relates to a method for handling a multi-component insulating gas, in particular during maintenance of electrical switchgear systems.

In electrical switchgear systems, electric arcs which can be produced in switching operations at relatively high voltages constitute a problem for the service life of such systems. The switching elements are damaged or destroyed in a short time by electric arcs. For this reason, in so-called gas-insulated switchgear systems insulating gases are employed which reduce or prevent the production of electric arcs. Gas-insulated switchgear systems have a hermetically defined system space, from which during operation first of all the air is removed and the system space is then filled with the insulating gas.

During the maintenance of gas-insulated switchgear systems, the insulating gas located in the system space must be removed from the system space before the maintenance can be carried out. After the maintenance, the insulating gas must then be transported back again into the system space. Various service devices are available on the market for such handling of insulating gases.

Sulfur hexafluoride (SF6) is a very inert gas, which on the basis of its electrically insulating characteristics very well suited as an insulating gas for switchgear systems. However, sulfur hexafluoride is also a greenhouse gas. For this reason, the use of sulfur hexafluoride should be reduced. Recently various gas mixtures which have similarly good insulating properties have become known as a substitute for sulfur hexafluoride as an insulating gas. The precise mixing ratio is important for the functioning of all of these gas mixtures.

SUMMARY OF THE INVENTION

The object of the invention is to create a possibility for handling multi-component insulating gases.

This object is achieved by a service device for a multi-component insulating gas, in particular for use during maintenance of electrical switchgear systems with a system space, comprising
a compressor with a downstream condenser,
a storage container,
wherein the service device is or can be connected to a system space,
wherein the compressor compresses the insulating gas during the removal thereof from the system space, wherein all components of the insulating gas remain in the compressor in a gaseous state, and the condenser is controlled by a controller such that a condensation of the insulating gas preferably occurs first in the storage container, and a storage heating device is provided for the storage container, and during filling of the system space the storage heating device heats the insulating gas to a temperature above the critical temperature of all components of the insulating gas, wherein, in particular, a line heating device is provided which at least partially heats the pipeline between the storage container and the system space and/or heats elements in the pipeline, such as, for example, filter housings or similar. A service device according to the invention for maintenance of electrical switchgear systems is or can be connected to a system space of the switchgear system. In this case the service device can either be fixedly on the switchgear system, wherein a fixed and permanently connected flange connection between switchgear system and service device may be appropriate, or the service device can be designed as a mobile device which is only connected to the switchgear system during maintenance. In the case of a mobile service device an easily releasable coupling between the service device and the switchgear system is more suitable as a connection in order for the required working time for connecting the service device to be kept to a minimum. Self-evidently, however, mobile service devices can also be connected to permanent flange connections and fixedly installed service devices can be connected by quick couplings to the switchgear system.

Furthermore, a service device according to the invention has a compressor with a downstream condenser. During the removal of the insulating gas from the system space the compressor draws the insulating gas in and subsequently compresses it. The condenser connected downstream serves to cool again the insulating gas which was heated during compression in the compressor. During the pressure increase in the compressor it may happen that one or more components of the insulating gas transition from the gaseous state into the liquid state. This phase transition takes place in the event of specific combinations of temperature and pressure. Moreover, the phase transition takes place with different gases, and thus also with the different components of the insulating gas, at different points. These points are in each case defined by pressure and temperature. A service device according to the invention is suitable for removal and filling of the most varied insulating gases from or into a switchgear system. Thus, a service device according to the invention can be used for moving the sulfur hexafluoride which is known from the prior art. In the case of such a one-component insulating gas, the previously described problem of separation of individual components does not exist. In order to save on the sulfur hexafluoride, which is harmful to the climate, gas mixtures exist which only contain a proportion of sulfur hexafluoride and in the which the remainder is formed by a different gas. The problem of separation of the components already occurs here as soon as a component is liquefied during the removal or filling of the insulating gas mixture from a switchgear system. Accordingly, a service device according to the invention is already advantageous in the handling of insulating gas mixtures which contain a certain proportion of sulfur hexafluoride. Recently insulating gases have also been employed which are free of sulfur hexafluoride. These gases likewise have a multi-component form. Precisely in the case of these gases it is particularly important to maintain the precise mixing ratio of the individual components relative to one another. Therefore, a service device according to the invention is particularly suitable for such multi-component insulating gases which are free of sulfur hexafluoride. Such insulating gases generally use $N_2$ or $CO_2$ as carrier component. However, the invention is not limited to this. One or more insulating gases are contained as additional components. For example, C5 ketone, HFO1234ze, HFO1234yf of fluoronitrile are suitable as such additional components. Several suitable insulating gas compositions which are free of sulfur hexafluoride are listed below, without limiting the invention thereto.

| carrier component | additional component |
|---|---|
| $N_2$ | C5 ketone |
| $N_2$ | HFO1234ze |
| $N_2$ | HFO1234yf |
| $CO_2$ | HFO1234yf |
| $CO_2$ | fluoronitrile |

The proportion the carrier component in these gas mixtures is preferably between 47% and 97%, and the proportion of the at least one additional component is between 3% and 53%.

Liquefaction of individual components of the insulating gas in the compressor would have a number of disadvantages. On the one hand, the almost incompressible liquid phase in the compressor would be disruptive for the operation thereof, and would have to be extracted from the compressor by means of additional complex precautions. On the other hand, the liquefaction of individual components of the insulating gas would lead to a change to the mixing ratio of the components. The liquefied components would more or less disappear from the insulating gas and only the remaining gaseous components would be transported further in the service device. It has been shown that a changed mixing ratio of the components leads to changed insulating properties of the gas mixture, which may have questionable consequences for the operation of the switchgear system. Thus, a maintenance operation in a gas-insulated switchgear system, in which a change to the mixing ratio of the insulating gas takes place, constitutes a deterioration of the insulating effect of the gas and thus of the operation of the entire switchgear system. Such a change to the mixing ratio of the components of the insulating gas would have a detrimental effect on the electrical properties of the insulating gas and thus must be avoided.

The compressor of a service device according to the invention is operated for prevention of these problems, so that all components of the insulating gas remain in the gaseous phase during the entire compression operation. Furthermore, a service device comprises a condenser which is arranged downstream of the compressor in the flow direction of the insulating gas. The purpose of this condenser is to cool the insulating gas heated during the compression operation. Cooling, and also a pressure increase, could lead to a phase transition of one or more components of the insulating gas into the liquid state. Therefore, the condenser of a service device according to the invention is controlled so that cooling only occurs to such an extent that all components of the insulating gas are still in the gaseous phase when leaving the condenser. In this case the condenser can be provided at various locations or positions in the course of the line along the path of the insulating gas from the compressor to the storage container. Since many compressors obtainable on the market have a fixedly installed condenser on the output side, it is particularly simple to use this condenser, arranged immediately downstream of the compressor, in a service device according to the invention. However, it is also possible to arrange the condenser further away from the compressor. An arrangement of the condenser further away from the compressor has the advantage that, due to its elevated temperature, the insulating gas heated after the compression is far away from the condensation point of all its components. This distance from the condensation point offers substantial security against the liquefaction of individual components on the path from the compressor to the storage container, where further system components, such as for example filters or similar, can be arranged.

Therefore, it is advantageously provided that the condenser is integrated with the compressor, in particular in a common frame or housing, or the condenser is provided separately from the compressor, in particular in the vicinity of the storage container.

The expression "in the vicinity of the storage container" should be understood to mean that the condenser is located between the storage container and the compressor at least in the half of the line which faces the storage container, in particular in the last 5, 10, 20 or 30% of the length of this line.

A service device according to the invention also has a storage container or can be connected to a storage container, which is likewise covered by the invention. After removal from the system space of the switchgear system, the insulating gas is stored (temporarily) in the storage container.

The space-saving storage in the liquid aggregate state is particularly advantageous for storage of the insulating gas. Therefore, it is desirable that as the insulating gas reaches the storage container it transition into the liquid state. According to the invention the gaseous transport of the insulating gas and the subsequent liquid storage is achieved in that the pressure and temperature of the insulating gas in the compressor or condenser are controlled so that the insulating gas after leaving the condenser with all its components is located just before the condensation point. On the last part of the path and in the storage container the insulating gas then cools further, which ultimately leads to a condensation of all the components in the storage container. In this case the service device is controlled so that the transition from the gaseous into the liquid phase, i.e. the condensation, if possible only takes place in the storage container. However, for the mixing ratio of the insulating gas it is of lesser importance if condensation of one or more of the components already takes place in the line system between the condenser and the storage container. At this point the line system is designed so that liquefied components also enter the storage container in liquid form, where they are mixed again with the remaining components condensing there.

It is particularly advantageous in a service device according to the invention that by corresponding regulation the compressor is operated in the optimal working range, without a liquid component being produced, and at the same time there is no separation of the insulating gas due to the extraction from the system space of a switchgear system.

A service device according to the invention for a multi-component insulating gas has, in addition to a compressor and a storage container, a storage heating device which heats the storage container as required. In this case, as has already been described above, the service device is connected or can be connected to a system space of an electrical switchgear system. The service device can be fixedly connected to the switchgear system or can be configured as a mobile device, which only for connected or joined to the system space for maintenance of the switchgear system. The insulating gas is stored (temporarily) in a storage container of the service device or, if a freshly supplied insulating gas is used, can be filled into this storage container before the filling of the system space of the switchgear system. In this case the storage of the insulating gas in the storage container takes place in the liquid state. This has the advantage that the volume of the insulating gas is significantly smaller than in the gaseous phase and so significantly less space is required for the storage. However, the storage of the insulating gas in the storage container can also take place in two phases, namely with one part of the insulating gas in liquid form and another part of the insulating gas in the gaseous state. This state can occur, for example, when only a little insulating gas is located in the storage container and pressure and/or temperature in the storage container are located in the vicinity of the evaporation point of one or more components of the insulating gas.

Before or during the filling of the system space with insulating gas using a service device according to the invention, the storage heating device heats the liquid stored insulating gas to a temperature which lies above the critical temperature of all of the components of the insulating gas. According to current specialist literature, the critical temperature should be understood to be that temperature above which, regardless of the prevailing pressure, no liquid phase of a substance or substance mixture can occur. Because a service device according to the invention heats the insulating gas before the transport into the system space of a switchgear system to a temperature above the critical temperature of all components of the insulating gas, it is ensured that during the transport no component transitions into the liquid state and so no change to the mixing ratio of the individual components of the insulating gas relative to one another can occur. Therefore, a service device according to the invention offers the advantage that the insulating gas arrives in the system space with the same unchanged mixing ratio of the individual components relative to one another, based on the mixing ratio in the storage container. Thus, it is ensured that the actual electrical properties of the insulating gas after the filling of the system space correspond to the properties which are necessary for safe operation of the switchgear system.

It is possible for a service device according to the invention to be configured according to the described embodiments as a pure removal device for insulating gas from the system space of a switchgear system. Furthermore, from the described embodiments it is also possible to configure a service device which serves merely for filling a system space with insulating gas. Lastly it is additionally possible to combine different embodiments with one another and so to configure a service device which in a single embodiment is both suitable for removing multi-component insulating gas from a switchgear system and likewise is suitable for filling or feeding back insulating gas into the system space of a switchgear system.

In a preferred embodiment of the proposal it is provided that the storage container is designed as a replaceable gas bottle or the storage container is fixedly arranged on the service device. In this embodiment, a replaceable gas bottle is used as a storage container. This has the advantage that larger quantities of removed insulating gas can be distributed to a plurality of quickly and easily replaceable gas bottles. The use of a conventional or standardized type of gas bottle which is readily obtainable on the market is particularly advantageous. As a result, in the event of an unplanned greater space requirement additional storage space can be simply acquired in situ without having to rely on special parts. Due to the use of a replaceable gas bottle as storage container, the transport or the exchange of insulating gas between different switchgear systems is facilitated. The transport of the gas can then take place independently of the service device. As an alternative to the replaceable gas bottle, the insulating gas in the service device can also be stored (temporarily) in a fixedly mounted storage container. The provision of a fixedly mounted storage container has the advantage that all necessary components of the service device are installed compactly in one device, which is particularly practical in the case of mobile service devices. It is also possible to provide, in addition to a fixedly installed storage container, one or more connections for replaceable gas bottles. In this combination, the advantages of both embodiments of the storage container are combined with one another in one single device.

Furthermore, in particular, a line heating device is provided which at least partially heats the pipeline between the storage container and the system space and/or heats elements in the pipeline, such as, for example, filter housings or similar. In a further embodiment of a service device, a line heating device is provided in addition to the storage heating device. This line heating device heats at least parts of the pipe system which in the service device extend from the storage container to the system space of the switchgear system to be filled. In this case the line heating device can also be configured so that it additionally or alternatively heats elements in the pipeline. Such elements can be, for example, a filter housing, pressure reducer, valves, couplings or similar. The object of such a line heating device is to ensure that the insulating gas heated in the storage container to a temperature above the critical temperature of all of its components does not cool on its path in the direction of the switchgear system to a temperature below the critical temperature of all components. In this case, cooling of the insulating gas to a temperature below this critical point could again lead to a liquefaction of individual components, which in turn would result in a change to the mixing ratio of the components of the insulating gas and should be avoided. It is possible, for example, to provide on the path from the storage container to the system space a plurality of temperature sensors which report the current temperature of the insulating gas to a control unit. In this case, if it is ascertained that the temperature drops to close to a critical temperature, the line heating device is activated and so the temperature of the insulating gas is raised again. Of course, it is also possible to provide a plurality of line heating devices, which is advantageous, for example, under cold climatic conditions. Furthermore, it is possible to configure the connecting pipelines so that they themselves can be heated.

It is advantageously provided that a controller is provided which regulates the working point of the compressor and/or of the cooler depending upon at least one current parameter of the insulating gas measured by a sensor, and/or the controller regulates the working point of the storage heating device depending upon at least one current parameter of the insulating gas measured by a sensor. In this embodiment of the invention a control unit which takes on various regulation tasks is provided in the service device. Such a controller regulates, for example, the working point of the compressor during the removal of the insulating gas from the system space. In this case at least one parameter of the multi-component insulating gas is used as an input variable for regulating the compressor. This at least one parameter is detected by one or more sensors and is transmitted via signal lines to the controller. Of course, it is also possible to use a plurality of parameters of the insulating gas as input variables for regulation. Possible parameters in this case are pressure, temperature, density, flow rate or similar. In this case the determined parameters can also be used in order to regulate the working point of the condenser connected downstream of the compressor. A particular advantageous of such regulation is that the working points of the compressor and/or the condenser are always adjusted to the currently measured parameters. Thus, it is ensured that the mixing ratio of the individual components of the insulating gas is kept constant even when environmental conditions, such as for example the external temperature, change. Due to the regulation, all working points are adapted continuously and optimally to the environmental conditions and to ensure safe and stable operation of the service device. In the same way, a storage heating device can also be regulated with the aid of a controller in its working point. The storage heating device serves to heat the insulating gas in the storage container to a temperature above the critical temperature of all components. This heating can take place particularly advantageously with the aid of a control loop, as one or more temperature sensors are provided in the storage container and a controller regulates the heating power or the working point of the storage heating device as a function of the data determined by the temperature sensor. Of course, it is also possible to connect further components or assemblies of the service device to the controller and thus to form further control loops. In addition, it is possible for components which are merely controlled to be connected to the controller. These components could be, for example, valves for which no dedicated sensor is provided to feed back actual information.

Furthermore, it is provided that an evacuating pump which serves for evacuation of the system space is provided. In this embodiment of the invention an evacuating pump is provided, which evacuates the system space of the electrical switchgear system before the filling with insulating gas. This should be understood to mean that this evacuating pump removes the air from the system space. The insulating properties of air are significantly poorer than those of insulating gas. If the air were to remain in the system space before the filling with insulating gas, it would dilute the introduced insulating gas and so would impair the insulating properties thereof. Therefore, the evacuating pump first of all generates a vacuum in the system space, so that no air or only a very small proportion of air remains therein. Next, with the aid of the service device the system space is filled with the insulating gas. In this case the evacuating pump is arranged in the service device so that a part of the pipe system of the service device can be closed off by valves so that the evacuated air can take exclusively the path to the evacuating pump and cannot flow in the direction of the compressor, condenser or storage container. After the evacuation operation, in the pipe system of the service device the path to the evacuating pump can be closed again with the aid of valves, so that during the filling of the switchgear system having insulating gas there is no longer any access to the evacuating pump.

An oil-free, in particular dry-running vacuum pump is advantageously provided which is arranged upstream of the compressor in the flow direction of the insulating gas. In this embodiment, a vacuum pump is provided which serves for extraction of the insulating gas from the system space. This vacuum pump is arranged between the system space and compressor and thus is located upstream of the compressor in the flow direction of the insulating gas. During the removal of the insulating gas from the system space it is important that the insulating gas is removed as completely as possible from the system space of the electrical switchgear system. On the one hand, this is necessary for protection of the service staff, since used insulating gas can contain decomposition products which are harmful to health and with which the people responsible for the service should not come into contact. On the other hand, a complete removal of the insulating gas from the system space has economic advantages, since after the service the same completely removed insulating gas can be reintroduced into the system and thus no new insulating gas has to be used. A vacuum pump connected upstream of the compressor offers the advantage that for extraction of the insulating gas a greater negative pressure can be generated than would be possible with the compressor alone. The vacuum pump is technically designed so that it develops the greatest possible negative pressure on the suction or inlet side. On the other hand, the output pressure of the vacuum pump is designed for optimal operation of the compressor deployed and thus is adapted to the optimal intake pressure thereof. Thus, the compressor can be used optimally for its actual purpose, namely the compression of the insulating gas. The provision of a vacuum pump is advantageous as a division of functions during the removal of the insulating gas from the system space. The vacuum pump ensures as far as possible a residue-free removal of the insulating gas from the system space, and then the compressor ensures an optimal compression of the insulating gas which is important for safe and space-saving storage of the gas. In this case it is particularly advantageous to provide a dry-running, oil-free vacuum pump. A dry-running vacuum pump ensures that during the process of extraction from the system space the insulating gas is not contaminated by lubricants of the vacuum pump, but reaches the compressor without any change to its composition.

In a preferred embodiment of the invention a filter is provided which is arranged upstream of the vacuum pump in the flow direction of the insulating gas. In this embodiment, a filter is arranged between the system space and the vacuum pump. This filter serves to remove contaminations from the insulating gas which can be produced during or by the operation of the electrical switchgear system. In this way, it is ensured that these contaminants cannot cause any damage in the vacuum pump and also in the subsequent assemblies such as the compressor or condenser.

Furthermore, a drying filter and/or a particle filter is/are provided, wherein this/these filter(s) is/are arranged downstream of the compressor in the flow direction. In this embodiment one or more filter(s) is/are arranged downstream of the compressor in the flow direction. These filters can have various designs. Thus, for example, a drying filter can be provided which removes moisture from the insulating gas.

In addition, or alternatively, a particle filter can be provided which removes particles from the flowing insulating gas. The filters arranged downstream of the compressor and condenser in the flow direction serve to remove undesirable substances from the extracted, used insulating gas before it is stored temporarily in the storage container. Due to this purification of the insulating gas during the process of extraction from the system space it is ensured that the gas stored in the storage container can be reintroduced without further cleaning steps into the system space of an electrical switchgear system and there it is again ensured that the gas functions safely as an insulating gas.

In a further preferred embodiment, a weighing means is provided, which determines the current weight of the gas bottle. Such a weighing means determines the current weight of the gas bottle and thus indirectly the mass of the insulating gas located in the gas bottle. The amount of stored insulating gas can then be determined by means of this mass of the insulating gas. The knowledge of how much insulating gas is located in the gas bottle can be used, for example, to ascertain when the storage capacity of the gas bottle reached Furthermore, it can be ascertained whether there is still sufficient insulating gas in the currently connected gas bottle for filling the system space of an electrical switchgear system. It is particularly advantageous to connect the weighing means to the controller of the service device. Such a connection could take place, for example, by means of a sensor line or also by means of a wireless connection. The information concerning the current weight of the gas bottle which is provided by the weighing means can then also be used by the controller for regulating a bottle heating device. Such a bottle heating device functions analogously to the already described storage heating device and serves for heating the insulating gas located in the gas bottle to a temperature above the critical temperature of all components of the insulating gas. Of course, it is also possible to provide a weighing means on a storage container fixedly installed on or in the service device and to use it in the same way as has been described in connection with the weighing means for a gas bottle.

The object of the invention is also achieved by a method for removing a multi-component insulating gas from a system space, in particular during maintenance of electrical switchgear systems, and for refilling the system space with a multi-component insulating gas, characterized by the sequence of the following steps:

removing the insulating gas from the system space,
compressing of the insulating gas in a compressor, wherein the compressor is operated so that all components inside the compressor remain in the gaseous phase,
condensing at least the majority of the compressed insulating gas in a storage container,
storing the liquid insulating gas in the storage container,
heating the insulating gas in the storage container to a temperature above the critical temperature of all components of the insulating gas before filling the system space,
and transporting the gaseous insulating gas, in particular by the compressor, into the system space.

A method according to the invention is proposed in order first of all to remove an insulating gas composed of a plurality of components from a system space and to store it temporarily in liquid form in a storage container. A method according to the invention is preferably employed in the maintenance of electrical switchgear systems, in order to remove the insulating gas from the system space before maintenance and to store it temporarily for refilling after the maintenance. In this case the method comprises a plurality of steps. First of all, the insulating gas is removed from the system space of the electrical switchgear system. In this case, for example, a vacuum pump can be employed for removal of the insulating gas. During the removal of the insulating gas it is particularly advantageous to remove the gas as completely as possible and without residue from the system space. Thus, it is ensured that no residual insulating gas disrupts the maintenance of the system space. Furthermore, no insulating gas is lost, so that during refilling of the system space no new insulating gas has to be obtained. In a subsequent step of the method the removed insulating gas is compressed. For this compression, a compressor is used which is operated so that all components of the insulating gas remain in the gaseous phase during the complete compression process. This remaining in the gaseous phase has advantages during operation of the compressor. If parts of the insulating gas transition into the liquid phase during operation of the compressor, these liquefied components would have to be continuously removed from the compressor. This removal of the liquid components should be avoided, since it represents a technical and thus also financial outlay. Furthermore, the liquefaction of individual components of the insulating gas in the compressor would have the consequence that the mixing ratio of the components with respect to one another changes. The liquefied components would remain in the compressor and only the gaseous components would be transported further in the direction of the subsequent process steps. However, precisely this mixing ratio of the individual components relative to one another is of essential significance for the insulating function of the insulating gas in the electrical switchgear system. Because the compressor is operated so that all components of the insulating gas remain in the gaseous phase, it is ensured that the mixing ratio of the components relative to one another during the compression operation remains constant and so the electrical characteristics of the insulating gas do not change. In a further method step at least, the majority of the compressed insulating gas in a storage container is condensed. The insulating gas is transported in the gaseous phase to a storage container. Only in the storage container is the insulating gas then condensed with all of its components. These condensation takes place by means of a reduction of the temperature of the insulating gas. In this case it is possible that a smaller part of the insulating gas already condenses in the last piece of the pipeline before the storage container. In this case also no change occurs to the mixing ratio of the individual components of the insulating gas relative to one another, since the pipe system upstream of the storage container is configured so that parts or components of the insulating gas liquefied therein are likewise guided into the storage container, where they are mixed again with the other, likewise liquefied parts or components.

In a further method step the insulating gas which is now present in liquid form is stored in the storage container. Storage in liquid form has the advantage that substantially less space is required for storing the same quantity of insulating gas than would be the case in the gaseous state. After maintenance has been carried out, the stored insulating gas can then either be reintroduced into the same electrical switchgear system or can be transported in the storage container and used at another location.

With the aid of the method according to the invention an insulating gas composed of a plurality of components is then introduced into the system space of an electrical switchgear system. The starting point in this case is the stored insulating gas present under pressure in liquid form in a storage container. The method according to the invention is particularly suitable for refilling a system space after maintenance. Of course, the method can also be used for first filling after the production of the switchgear system. In a first method step of the filling operation the insulating gas is heated in the storage container. In this case the heating takes place up to a temperature above the critical temperature of all components of the insulating gas. The critical temperature designates the temperature above which a gas no longer transitions into the liquid phase. A gas heated to a temperature above the critical temperature no longer transitions into the liquid phase, even under high pressures. Due to the heating of the insulating gas to a temperature above the critical temperature of all the components it is ensured that during the process of filling the system space, during which pressure differences can occur, none of the components liquefy again. Thus, it is ensured that the mixing ratio of the individual components of the insulating gas relative to one another during the filling operation remains constant. In a further method step the gaseous insulating gas heated to a supercritical temperature is transported into the system space of an electrical switchgear system. A compressor is suitable, in particular, for generating the pressure required for this transport. This transport of the insulating gas to the system space takes place exclusively in the gaseous phase. If the environmental conditions make it necessary, parts of the pipe system or of the assemblies through which the insulating gas flows on its path are provided with a heating system which ensures that the insulating gas does not cool to subcritical temperatures on its path. Due to the transport of the insulating gas at a temperature above the critical temperature of all its components, it is ensured that the mixing ratio of the components relative to one another remains constant during the transport. As a result, it is likewise ensured that the electrical characteristics of the insulating gas remain unchanged and safe functioning is ensured during operation in an electrical switchgear system.

In a preferred embodiment of the invention it is provided that the compressed insulating gas is cooled in a condenser connected downstream of the compressor in the flow direction in such a way that if possible no constituent of the insulating gas condenses in the condenser. In this embodiment of a method according to the invention it is provided that the insulating gas heated during the compression in the compressor is cooled in a condenser located downstream of the compressor in the flow direction. In this case the condenser is operated in such a way that, due to the cooling, if possible no constituent or no component of the insulating gas condenses. In this case the purpose of the condenser is to reduce the temperature again after the compression, since condensation of the insulating gas with all its components should take place in the storage container located in the vicinity. However, the condensation should only take place in the storage container, but not already in the condenser. Condensation in the condenser would lead to the change to the mixing ratio of the individual components of the insulating gas relative to one another which has already been described a number of times. Therefore, such a change to the mixing ratio of the insulating gas should be prevented by the described working point of the condenser, in so far as this is possible.

Advantageously, the insulating gas passes through a filter during the extraction from the system space upstream of the compressor in the flow direction or upstream of a vacuum pump provided in the flow direction. In this embodiment of a method a filtering step is provided, in which contaminants are removed by a filter before passing through the compressor or the vacuum pump. This is particularly advantageous, since in this way damage to the compressor or the vacuum pump due to contaminants in the extracted insulating gas is avoided.

Advantageously, it is provided that during the compression of the insulating gas the compressor is regulated by a controller so that all components of the insulating gas remain in the gaseous phase during the compression process. In this embodiment of a method a controller is employed, which regulates the working point of the compressor continuously and in adaptation to the environmental conditions, so that all components of the insulating gas remain in the gaseous phase during the entire compression process. In this case it is possible that in order to regulate the compressor the controller uses different pieces of information provided by sensors. The working point of the compressor is then regulated so that at any time it is ensured that all components remain gaseous during the compression. Such a regulation unit can compensate for changes, for example, due to changed environmental conditions. Thus, it is ensured that at any time a liquefaction of one or more components of the insulating gas during the compression is avoided. As a result, the insulating gas is compressed to the required extent without the electrical properties thereof being changed by the compression.

Furthermore, it is advantageously provided that the weight of the gas bottle during heating of the insulating gas located therein is measured with the aid of a weighing means and the measured value is fed to the controller. In this embodiment, the weight of the gas bottle and thus indirectly also the weight of the insulating gas contained therein is measured with the aid of a weighing means. The measured value is then fed to the controller and is used therein, for example, as input information for regulation of the bottle heating. Moreover, the weight of the insulating gas located in the gas bottle provides information about the amount of insulating gas which is still available for filling of the system space. Thus, for example, it can be recognised whether by completion of the filling of the system space a further gas bottle with insulating gas is required or not.

Furthermore, it is advantageously provided that before the transport of the supercritically heated insulating gas into the system space the air out is extracted from the system space with the aid of an evacuating pump. In this embodiment of a method, before the transport of the insulating gas into the system space the air located there is removed. An evacuating pump is employed for this evacuation of the system space. The removal of the air from the system space before the filling with the insulating gas serves to achieve the most optimal insulating properties of the insulating gas in the system. Air clearly has a poorer insulation behavior than the multi-component insulating gas. If air were to remain in the system space before the filling with insulating gas, this air and the insulating gas would mix during the filling. The consequence of this dilution of the insulating gas would be substantially poorer electrical insulating properties of the gas mixture. Thus, the removal of the air from the system space makes an important contribution to the safe operation of the electrical switchgear system after the refilling with insulating gas.

The object of the invention is also achieved by the use of a service device according to one of the described embodiments which serves, in particular, for carrying out a method according to one of the described embodiments, in particular during maintenance of switchgear systems which are filled with an insulating gas consisting of a plurality of different components, wherein these different components have different physical properties such as, for example, different critical points. The use of a service device according to one of the described embodiments is particularly advantageous in or for the maintenance of a gas-insulated switchgear system. The use of insulating gases composed of a plurality of gases or components has recently become established in such gas-insulated switchgear systems. Naturally, different gases also have different physical properties such as, for example, liquefaction pressures, liquefaction temperatures or critical temperatures. During maintenance of electrical switchgear systems which are filled with such multi-component insulating gas it must be ensured that there are no changes to the properties of the insulating gas due to removal from and reintroduction into the system space. A service device according to one of the described embodiments has proved particularly advantageous for such use, since when such a device is used no changes are produced in the properties of the insulating gas by the maintenance operation. A service device of this type is designed so that in the course of transport of the multi-component insulating gas through the service device all components remain in the gaseous phase and so none of the components is partially or completely removed from the gas mixture by separate liquefaction. During use of service devices which are designed for handling of one-component insulating gases, this liquefaction of individual components often leads to unwanted separation, which is particularly critical for the operation of switchgear systems if this separation is not recognised. Of course, it is also possible to use a service device according to the invention for maintenance of switchgear systems containing an insulating gas consisting of only one component. In general, however, the use of a service device according to one of the described embodiments is suitable for handling various types of gas mixtures in which a constant mixing ratio between the individual components of the gas mixture should be ensured throughout the handling process.

In a preferred embodiment of the invention it is provided that the multi-component insulating gas with which the switchgear systems to be maintained are filled contains no SF6 (sulfur hexafluoride) and this insulating gas includes at least one carrier component which is formed by $N_2$ or $CO_2$. During this use of a service device and method the moved insulating gas contains no sulfur hexafluoride. This use is particularly advantageous for environmental protection, since the moved insulating gas contributes to the greenhouse effect to a substantially lesser extent than sulfur hexafluoride and thus any gas inadvertently escaping causes substantially less damage. As a substitute for sulfur hexafluoride at least one carrier component is provided which is formed by $N_2$ or $CO_2$. Such a multi-component insulating gas also contains a further component in addition to the carrier component.

Furthermore, it is provided that the multi-component insulating gas contains, in addition to the carrier component, an additional component which is formed by C5 ketone, HFO1234ze, HFO1234yf, fluoronitrile or a combination of these gases. In this embodiment of a use of a service device and method, a multi-component insulating gas also contains, in addition to the carrier component, an additional component which is formed by at least one of the insulating gases C5 ketone, HFO1234ze, HFO1234yf or fluoronitrile. Of course, these additional components can also be formed by a mixture or combination of said gases or can contain an alternative component having advantageous properties. Mixing ratios of the carrier component and the additional component which can be used in practice are described above.

In this connection it is pointed out, in particular, that all features and characteristics but also procedures described with regard to the parking service device are also transferable analogously in relation to the formulation of the method according to the invention or the use according to the invention and can be employed in the context of the invention and may be regarded as also disclosed hereby. The same also applies conversely, in other words structural features, i.e. features in apparatus terms, which are only mentioned with regard to the method or use thereof can also be taken into account and claimed in the context of the claims for the service device, and are likewise included in the disclosure. The same also applies analogously between the method according to the invention and the use according to the invention.

BRIEF DESCRIPTION OF THE DRAWINGS

The invention is illustrated schematically, in particular, in one exemplary embodiment in the drawings. In the drawings:

FIG. 1 shows a schematic representation of an embodiment of a service device according to the invention.

DETAILED DESCRIPTION OF THE INVENTION

FIG. 1 a schematic representation of an embodiment of a service device can be seen. The system space 1 of the switchgear system, which during operation of the switchgear system is filled with a multi-component insulating gas, is located in the right lower corner. The other elements in FIG. 1 show parts or components of an embodiment of a service device. In this case this service device can be connected fixedly and permanently to the electrical switchgear system and the system space 1, or the service device can be designed as a mobile device which is connected to the system space 1 only as required or during maintenance. In each case the service device is connected by means of the coupling 11 to the system space 1. In this case this coupling 11 can be configured in the most varied ways. Quick couplings are conceivable which are connected to one another or separated from one another with the aid of simply actuated sliding or rotary elements. Furthermore, flange connections are possible which can be screwed, welded or connected in other ways to one another and sealed off. The selection of a suitable coupling 11 depends upon whether the service device is a fixedly installed device or a mobile device. In the case of a mobile device, quick couplings are preferable for reasons of user-friendliness.

For a better understanding of the following description of the service device, concepts for three different paths of the insulating gas through the service device are introduced. On a removal path 50 the insulating gas is removed from the system space 1 and is transferred into the storage container 6 or the glass bottle 5 for interim storage. On the return path 60 the insulating gas is then transported the other way round from the storage container 6 or the gas bottle 5 back into the system space 1 of the switchgear system. The bypass path 70 has the same function and largely the same configuration as the removal path 50, but on the bypass path 70 the vacuum pump 4 is bypassed.

The removal path 50 begins at the coupling 11 and initially extends upwards through the filter 7 and the valve 41 to the vacuum pump 4. The vacuum pump 4 serves, by generating a strong negative pressure, to extract the insulating gas almost completely from the system space 1. For high-quality maintenance of a switchgear system it is important for the insulating gas located therein to be removed as completely as possible, wherein as far as possible the insulating gas should not escape into the environment. Thus, on the one hand, the purpose of the vacuum pump 4 is to empty the system space 1 if possible so as to be residue-free, and, on the other hand, the purpose of the vacuum pump 4 is to provide on its output side a suitable operating pressure which enables further transport of the insulating gas to the compressor 3. A first filter 7 is located between the system space 1 and the vacuum pump 4. During operation of the switchgear system the insulating gas is chemically changed by various processes and is thereby contaminated. These processes which lead to changes to the insulating gas include, for example, electric arcs which are produced briefly during switching operations. These electric arcs act thermally and electrically on the insulating gas and can sometimes produce toxic decomposition products. Therefore during the maintenance of the switchgear system the insulating gas is filtered a number of times, so that changes and decomposition products are removed from the insulating gas. The filter 7 constitutes a first filter stage for purification of the insulating gas before it enters the vacuum pump 4. On the removal path 50 the insulating gas leaves the vacuum pump 4 on the left page and next it enters the compressor 3. There the insulating gas is then compressed in order to enable space-saving storage during the maintenance of the switchgear system. As has been described above, modern insulating gases, for which the greenhouse effect is substantially less than that of the long-established SF6, are composed of a plurality of components. With such a composition of a plurality of components there is the risk that first of all one of the components transitions from the gaseous phase into the liquid phase as the pressure rises in the compressor, whereas the rest of the components of the insulating gas still remain in the gaseous phase. Such transitions, which are staggered in terms of time or space relative to one another, of the individual components into the liquid phase would lead to a change to the mixing ratio of the individual components relative to one another. The components which liquefy first would be more or less lost from the gas mixtures and remain in the compressor, whereas the rest of the components would be transported further on the removal path 50 in gaseous form. In order to solve this problem, the compressor 3 is operated in such a way that an increase in pressure of the insulating gas only takes place to such an extent that all components are always still in the gaseous state as they leave the compressor 3. The output pressure of the compressor 3 is therefore set so that it is below the condensing pressure of the components which have the lowest condensing pressure of all components.

Therefore, the insulating gas leaves the compressor 3 completely in gaseous form and next enters the condenser 32.

The insulating gas heated during the compression operation in the compressor 3 is cooled again in the condenser 32. In this case the condenser 32 is operated so that all components of the insulating gas are still in the gaseous state at the output of the condenser 32. However, due to the cooling operation the gas mixture is close to the liquefaction point, namely a combination of the critical temperature and the critical pressure. In the further course of the removal path 50 the insulating gas passes through the valve 31 as well as the dry air filter 12 and the particle filter 13. After the insulating gas has passed through the valve 62 arranged downstream of the particle filter 13 it finally enters the storage container 6 via the connector coupling 63. Alternatively, the insulating gas is conveyed via a bottle coupling 51 into a gas bottle 5. The temperatures and pressures on the removal path 50 are set and regulated so that a liquefaction of the insulating gas only takes place in the storage container 6 or the gas bottle 5. The liquefaction in the storage container 6 or the gas bottle 5 then takes place due to a temperature which is slightly reduced by comparison with the pipeline of the removal path. Storage or interim storage of the multi-component insulating gas in liquid form offers an enormous saving of space by comparison with storage in the gaseous state.

The transport of the insulating gas in the gaseous state on the removal path 50 and a subsequent liquefaction of the multi-component insulating gas in the storage container 6 or a gas bottle 5 offers very good protection against an unwanted change to the mixing ratio of the individual components of the insulating gas and at the same time offers space-saving storage in the liquid state. The function of the controller 8 is to regulate the individual components or assemblies of the service device so that the insulating gas has the desired state in all parts of the system. A plurality of sensors are connected to the controller 8 and are represented in FIG. 1 by means of arrows pointing in the direction of the controller 8. Furthermore, the controller 8 has a plurality of manipulated variables which are represented by arrows pointing in the direction of the corresponding component to be set. A state sensor 33 is provided downstream of the condenser 32 on the removal path 50 and is connected via the sensor line 85 to the controller 8. This state sensor 33 determines the pressure and/or temperature and/or the aggregate state of the insulating gas after leaving the condenser 32. The controller 8 then uses the information of the state sensor 33 in order to regulate the compressor 3 and the condenser 32. For this purpose, the controller 8 is connected via the actuating line 81 or 86 to the assemblies. It would also be possible here to provide further state sensors on the removal path 50. Thus, for example, a further state sensor could be mounted between the compressor 3 and the condenser 32, in order to be able to analyze the insulating gas as it leaves the compressor 3. A further state sensor 64 is provided on the removal path and determines the state of the insulating gas on its path from the condenser 32 to the storage container 6 after passing through the valve 31, the dry filter 12, the particle filter 13 and the valve 62. The information supplied by the state sensor 64 is likewise used in the regulation of the compressor 3 and the condenser 32 performed by the controller 8.

The controller is also connected to the valves of the service device, for example the valves 31 and 62. In this case the controller can recognize the state of the valves, in particular whether they are open or closed, and can also change the state of the valves. For reasons of clarity the sensor lines and actuating lines between the controller 8 and the valves are not shown in FIG. 1.

After maintenance work has been carried out on the switchgear system or on the system space 1, the insulating gas is transported again into the system space 1 with the aid of the service device. During this return transport, the insulating gas is converted from its liquid state back again into the gaseous operational state for use in the switchgear system. During this transformation and the transport by the service device it is also particularly important that the mixing ratio of the individual components of the insulating gas relative to one another is not changed. At the start of the return of the insulating gas into the system space 1, the gas mixture in the storage container 6 or in a gas bottle 5 is heated to a temperature above the evaporation temperature of all the components of the insulating gas. Thus, the insulating gas is already converted back into the gaseous state in the storage container 6 or the gas bottle 5. The storage heating device 61 and/or the bottle heating device 52 are provided in order to raise the temperature. These heating devices are regulated by the controller 8 via the actuating lines 82 and 83. Sensors and sensor lines, which are not shown in FIG. 1 for reasons of clarity, are provided for determining the current temperature. The weighing means 53 is provided in order to determine the current weight of the gas bottle 5, and thus indirectly in order to determine the weight of the insulating gas located in the gas bottle 5. This weighing means 53 is connected to the controller 8 via the sensor line 87. The controller 8 uses the information determined by the weighing means 53 in order to regulate the bottle heating device 52.

During the return into the system space 1 the insulating gas is guided on the return path 60 by the service device. Before the return of the insulating gas the valves 62, 71, 41 and 21 are closed in order to open the return path 60 and to differentiate it from the other paths. The insulating gas then passes first of all through a pressure reducer and the open valve 65. The return path 60 is symbolised by means of arrows in FIG. 1. On the return path 60 the compressor 3 is used for generating the required conveying pressure for transport of the insulating gas back into the system space 1. After passing through the valve 65 the insulating gas is guided through a pressure reducer and extracted from the compressor 3. After leaving the compressor 3 the insulating gas passes to the condenser 32, but in this case is not cooled there. The insulating gas is then guided further through the valve 31 through the two filters 12 and 13. Next the insulating gas passes through the open valve 66 as well as a further pressure reducer. The line heating device 90 is provided on the return path 60. This line heating device 90 is used when the insulating gas is cooled on the return path 60 to such an extent that individual components of the gas liquefy. This liquefaction of individual components would, as already described, lead to a change to the mixing ratio of the insulating gas in the system space 1. The risk of a possible liquefaction of individual components is countered by reheating of the insulating gas on the return path with the aid of the line heating device 90. The line heating device 90 is regulated by the controller 8 via the actuating line 88. The information required for this regulation is provided to the controller 8 by sensors such as, for example, the state sensor 33. For the regulation of the line heating device 90 further sensors can also be provided which are not shown in FIG. 1. Furthermore, it is possible to provide a plurality of line heating devices 90 on the return path 60. At the end of the return path 60 the insulating gas is guided via the coupling 11 back into the system space 1. On the return path of the service device it is possible to provide a plurality of connections or couplings for connection to system spaces of switchgear systems such as, for example, the substitute coupling 14. Therefore, in FIG. 2, in addition to the coupling 11 used a further coupling 51 is provided, to which no switchgear system is connected in the illustrated case.

The bypass path 70 serves to bypass the vacuum pump 4 during removal of the insulating gas from the system space 1. After bypassing the vacuum pump 4 this bypass path 70 opens into the removal path 50 already described. During use of the bypass path 70 the transport of the insulating gas from the system space 1 to the storage container 6 or the gas bottle 5 only takes place with the aid of the compressor 3. In this case no further assemblies are used for building up a required pressure for transport of the multi-component gas. When the bypass path 70 is to be used the valve 41 should be closed and the valve 71 is open.

The evacuating pump 2 is shown in FIG. 1 in the right upper area. This evacuation pump 2 serves to remove the air from the system space 1 before the filling with the insulating gas. For this purpose, the valves 41 and 71 are closed and the valve 21 is open. The evacuating pump 2 then extracts the air from the system space 1 and discharges it to the environment. The removal the air from the system space 1 likewise serves the maintenance of a constant mixing ratio of the individual components of the insulating gas relative to one another. If a significant amount of air were to remain in the system space before the filling, the insulating gas would be diluted by this air, which in turn would lead to an undesirable change to the properties of the gas mixture.

In the drawings, the same or corresponding elements are in each case designated by the same reference numerals and therefore are not described again unless this is expedient. The disclosures contained in the entire description can be transferred analogously to parts which are the same with the same reference numerals or the same component designations. Also, the positional details selected in the description, such as for example top, bottom, side, etc., relate to the drawing immediately described and illustrated and may be transferred to the new position in the event of a change in position. Furthermore, individual features or combinations of features of the different illustrated and described exemplary embodiments may also constitute separately independent or inventive solutions or solutions according to the invention.

The claims filed now with the application and later are without prejudice for the achievement of more far-reaching protection.

If closer examination, in particular also of the relevant prior art, reveals that one or the other feature is favourable for the object of the invention, but is not crucially important, then of course a formulation will be sought which no longer includes such a feature, in particular in the main claim. Also, such a sub-combination is covered by the disclosure of this application.

It should also be noted that the configurations and variants of the invention described in the various embodiments and illustrated in the drawings can be combined with one another in any way. In this case individual features or a plurality of features are interchangeable with one another in any way. These combinations of features are also disclosed.

The dependencies set out in the dependent claims refer to the further embodiment of the subject matter of the main claim by the features of the respective subordinate claim. However, these are not to be understood as a renunciation of the achievement of independent objective protection for the features of the dependent subordinate claims.

Features which have only been disclosed in the description or also individual features from claims which include a plurality of features can be incorporated into the independent claim/claims as features of essential significance to the invention in order to distinguish them over the prior art at any time, even when such features have been mentioned in connection with other features or also achieve particularly favourable results in connection with other features.

The invention claimed is:
1. A service device for a multi-component insulating gas for use during maintenance of electrical switchgear systems with a system space, comprising
 a compressor with a downstream condenser,
 a storage container,
 wherein the service device is connected to the system space, and
 wherein the compressor compresses the insulating gas during removal thereof from the system space,
 wherein all components of the insulating gas remain in the compressor in a gaseous state, and
 a controller being configured to control the condenser such that a condensation of the insulating gas occurs first in the storage container, and
 a storage heating device is provided for the storage container, and
 the storage heating device is configured to heat the insulating gas to a temperature above the critical temperature of all components of the insulating gas during filling of the system space,
 a pipeline extending between the storage container and the system space;
 wherein, a line heating device is provided which at least partially heats the pipeline between the storage container and the system space and/or heats elements in the pipeline.

2. The service device according to claim 1, wherein the controller regulates a working point of the compressor and/or of the condenser depending upon at least one current parameter of the insulating gas measured by a sensor.

3. The service device according to claim 1, wherein the controller regulates a working point of the storage heating device depending upon at least one current parameter of the insulating gas measured by a sensor and/or the storage container is designed as a replaceable gas bottle or the storage container is fixedly arranged on the service device.

4. The service device according to claim 1, wherein an evacuating pump is provided which serves for evacuation of the system space.

5. The service device according to claim 1, wherein an oil-free vacuum pump is provided which is arranged upstream of the compressor in the flow direction of the insulating gas.

6. The service device according to claim 1, wherein a filter is provided which is arranged upstream of a vacuum pump in the flow direction of the insulating gas and/or a drying filter and/or a particle filter is/are provided, wherein the drying filter and/or the particle filter is/are arranged downstream of the compressor in the flow direction.

7. The service device according to claim 1, wherein a weighing means is provided which determines a current weight of a gas bottle.

8. The service device according to claim 1, wherein the condenser is integrated with the compressor, in a common frame or housing, or the condenser is provided separately from the compressor in the vicinity of the storage container.

* * * * *